United States Patent [19] [11] Patent Number: 5,074,487
Okamura et al. [45] Date of Patent: Dec. 24, 1991

[54] TAPE REEL FOR TAPE CASSETTE

[75] Inventors: Masatoshi Okamura; Hiroshi Kaneda, both of Saku, Japan

[73] Assignee: TDK Corporation, Japan

[21] Appl. No.: 450,283

[22] Filed: Dec. 13, 1989

[30] Foreign Application Priority Data

Dec. 23, 1988 [JP] Japan .................. 63-165671[U]

[51] Int. Cl.⁵ .............................................. B65H 75/18
[52] U.S. Cl. ............................................... 242/71.8
[58] Field of Search .................... 242/71.8, 199, 117, 242/118, 118.4, 118.6; 360/132, 135

[56] References Cited

U.S. PATENT DOCUMENTS

| | | | |
|---|---|---|---|
| 3,334,402 | 8/1967 | Cave | 242/71.8 |
| 4,083,509 | 4/1978 | Vasudeva et al. | 242/71.8 |
| 4,088,278 | 5/1978 | Adair | 242/71.8 |
| 4,203,564 | 5/1980 | Nemoto | 242/71.8 |
| 4,607,806 | 8/1986 | Yealy | 242/117 |
| 4,797,764 | 1/1989 | Doering | 360/135 |
| 4,880,180 | 11/1989 | Adair | 242/71.8 |
| 4,911,967 | 3/1990 | Lazzari | 360/135 X |

Primary Examiner—Daniel P. Stodola
Assistant Examiner—John P. Darling
Attorney, Agent, or Firm—Lerner David Littenberg Krumholz & Mentlik

[57] ABSTRACT

A tape reel for a tape cassette includes stabilizing ribs positioned on opposite sides of a deposition rib. The stabilizing ribs are lower in height than the deposition rib and are provided with an abutment surface which extends parallel to the joining surfaces of the reel hub and reel flange. As the deposition rib is melted to join the reel hub and reel flange together, the melt distributes uniformly between the joining surfaces of the reel hub and reel flange, thereby preventing any deformation of the tape reel, such as deflection and/or warpage of the outer periphery thereof. A simplified manufacturing process yielding uniform product quality results.

18 Claims, 5 Drawing Sheets

TAPE REEL FOR TAPE CASSETTE

FIELD OF THE INVENTION

The present invention relates to a tape reel for a tape cassette, such as a video tape cassette, a magnetic tape cassette or the like. More particularly, the present invention relates to a tape reel for a tape cassette in which a tape is wound on a pair of tape reels which are rotatably arranged.

BACKGROUND OF THE INVENTION

Tape reels which are incorporated in tape cassettes, such as video tape cassettes, are typically constructed in a manner such as shown in Figs. 1A and 1B. Specifically, the conventional tape reels include a reel hub 100 and a reel flange 102 having a deposition rib 104 formed on an end surface thereof opposite to the reel hub 100. Reel hub 100 and reel flange 102 are integrally joined to one another by thermal or ultrasonic welding of deposition rib 104 or other similar joining means.

The connection of reel hub 100 to reel flange 102 by ultrasonic welding is carried out while forcibly pressing against the central portion of deposition rib 104 by means of the horn of an ultrasonic welding machine and regulating the vertical position of the reel flange 102 with respect to the reel hub 100 by means of the upper end of the outer periphery of the reel hub 100. In ribs having the conventional structure of deposition rib 104, a melt 106 formed by melting the deposition rib 104 fails to spread uniformly between the reel hub 100 and the reel flange 102 so that the melt 106 on one side of deposition rib 104 has a significantly different thickness than the melt 106 on the opposite side of deposition rib 104. As a result, the reel flange 102 is joined to the reel hub 100 at an oblique angle, as shown in FIG. 1B.

Unfortunately, the inclination of the reel flange 102 with respect to reel hub 100 causes sufficient deflection and/or warpage to occur at the outer periphery of the reel flange 102 so that a tape reel of inferior quality is produced. As a result, quality control in the production of such tape reels is highly troublesome causing poor production yields. Moreover, this process causes significant variations in the pressure exerted by the horn of the ultrasonic welding machine on the deposition rib 104, thereby leading to joining failures. As a result of the foregoing, it is apparent that the structure of conventional tape reels hinders productivity.

Thus, the need exists for a tape reel for tape cassettes which is capable of being manufactured at high speeds in highly simplified processes which are capable of achieving high yields.

SUMMARY OF THE INVENTION

Generally speaking, in accordance with the present invention, a tape reel for a tape cassette is provided. The tape reel includes a hub having a joining surface and a reel flange having a joining surface opposite to the joining surface of the reel hub. The reel hub and reel flange are adapted to be joined together through the respective joining surfaces. The tape reel also includes a deposition rib arranged on the joining surface of either the reel hub or the reel flange. The tape reel further includes stabilizing ribs provided on the joining surface of at least one of the reel hub and reel flange, and arranged in a manner to interpose the deposition rib therebetween with a suitable interval being defined between the deposition rib and each of the stabilizing ribs. The stabilizing ribs each have a height which is lower than that of the deposition rib and an abutment surface substantially parallel to the joining surfaces of the reel hub and reel flange.

In a preferred embodiment of the present invention, the deposition rib is arranged in the form of an intermittent annular shape on the joining surface of the reel flange.

According to one embodiment of the present invention, the stabilizing ribs are arranged on the joining surface of the reel flange. According to another embodiment of the present invention, the stabilizing ribs are arranged on the joining surface of the reel hub. Alternatively, the stabilizing ribs may be separately arranged on the joining surfaces of the reel hub and reel flange, respectively.

In a preferred embodiment, the stabilizing ribs are each formed into an intermittent or discontinuous annular shape.

The tape reel of the present invention may further comprise positioning means for properly positioning or aligning the reel hub and reel flange with respect to one another, which positioning means is arranged outwardly of the stabilizing ribs.

In a preferred embodiment, the positioning means comprises an annular groove formed on the joining surface of one of the reel hub and reel flange, and an annular projection formed on the joining surface of the other of the reel hub and reel flange and matingly engaged with the annular groove.

As described above, the tape reel of the present invention is so constructed that the reel flange is matingly joined onto the reel hub on which a tape is wound, thereby permitting the molten deposition rib to uniformly spread while being pressed at the central portion thereof by the horn of a welding machine, such as an ultrasonic welding machine or the like. This not only permits the space between the deposition rib and each of the stabilizing ribs arranged on both sides of the deposition rib to be fully filled with the melt, but also provides the melt with a uniform thickness, thereby effectively preventing the generation of deflection and/or warpage at the outer periphery of the tape reel. Furthermore, the present invention positively controls the amount of pressing of the reel flange by the horn of the ultrasonic welding machine.

Accordingly, it is an object of the present invention to provide a tape reel for a tape cassette which is capable of being manufactured in high yields and with high precision.

It is another object of the present invention to provide a tape reel for a tape cassette which permits the manufacture of the tape reel to be highly simplified.

It is a further object of the present invention to provide a tape reel for a tape cassette which permits the manufacture of the tape reel to be carried out at a high speed.

It is still another object of the present invention to provide a tape reel for a tape cassette which is capable of being mass produced at a low cost.

It is yet another object of the present invention to provide a tape reel for a tape cassette which may be manufactured to the highest quality standards.

It is still a further object of the present invention to provide a tape reel for a tape cassette which facilitates quality control during manufacturing.

It is yet a further object of the present invention to provide a tape reel for a tape cassette which accomplishes the above-noted objects with a simple structure.

BRIEF DESCRIPTION OF THE DRAWINGS

A more complete appreciation of the subject matter of the present invention and the various advantages thereof can be realized by reference to the following detailed description, in which reference is made to the accompanying drawings in which:

FIG. 9 is a fragmentary schematic sectional view showing another modification of the tape reel shown in FIG. 6.

DETAILED DESCRIPTION OF THE PREFERRED EMBODIMENTS

Figure 1A:
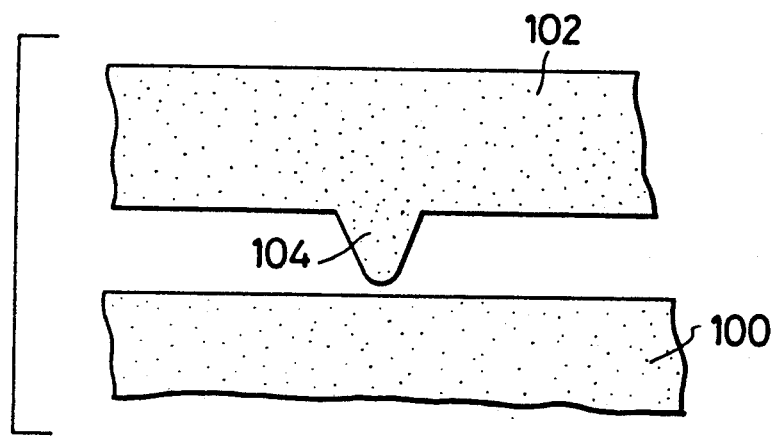
FIG. 1A is a fragmentary schematic sectional view showing a reel hub and a reel flange in a conventional tape reel for a tape cassette.
Figure 1B:
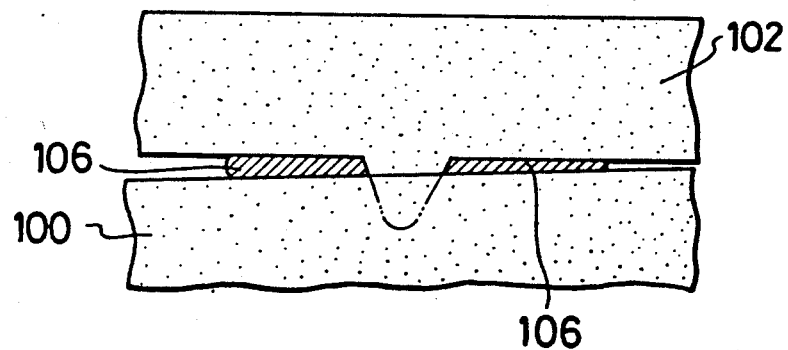
FIG. 1B is a fragmentary schematic sectional view showing the joint between the reel hub and the reel flange of the conventional tape reel shown in FIG. 1A.

A tape reel for a tape cassette according to the present invention will be described hereinafter with reference to FIGS. 2-9, wherein like reference numerals designate like or corresponding parts throughout. Although described herein in connection with video tape cassettes, the tape reel of the present invention is not limited to use in such video tape cassettes, but may also be used in other types of cassettes of the type generally known in the art.

Figure 2:
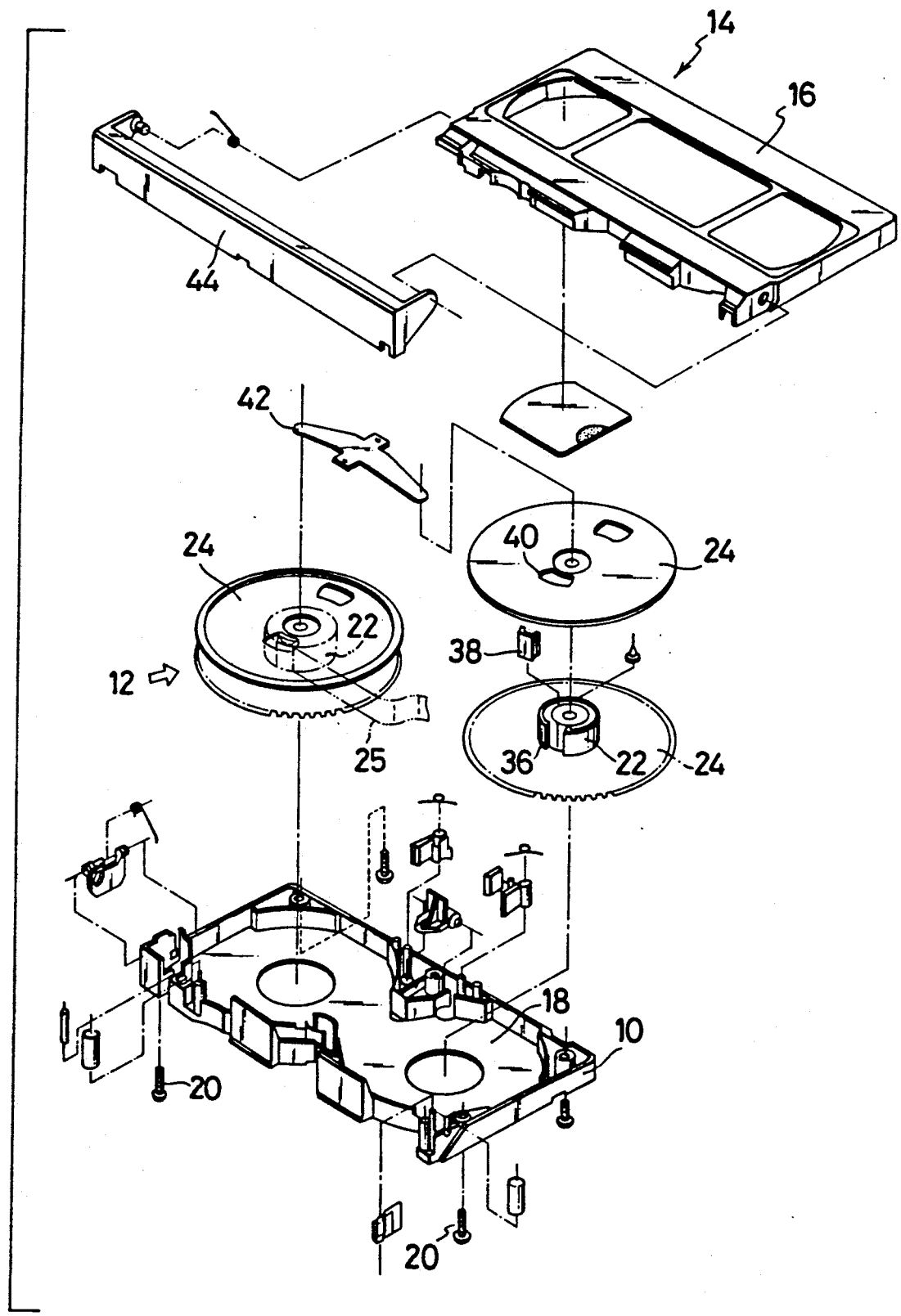
FIG. 2 is an exploded perspective view of a tape cassette incorporating one embodiment of the tape reel in accordance with the present invention.

FIG. 2 shows a video tape cassette 10 incorporating one embodiment of the tape reel 12 according to the present invention. The video tape cassette 10 includes a casing 14 comprising an upper casing member 16 and a lower casing member 18 joined together by means of screws 20. A pair of tape reels 12 are arranged in the casing 14 of tape cassette 10, along with a pressing leaf spring 42. A shutter 44 extends along one edge of casing 14.

Figure 3:
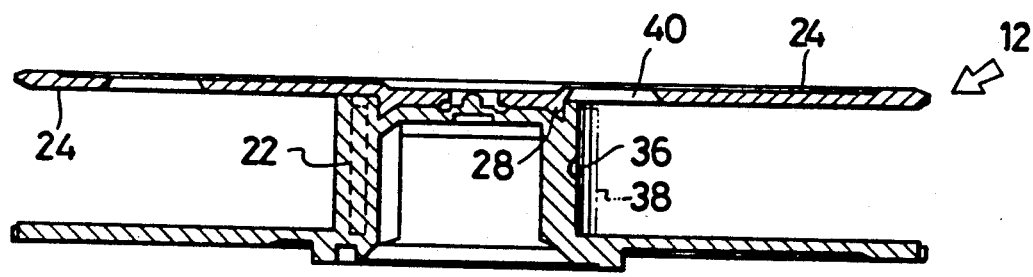
FIG. 3 is an enlarged vertical sectional view of the tape reel shown in FIG. 2.
Figure 4:
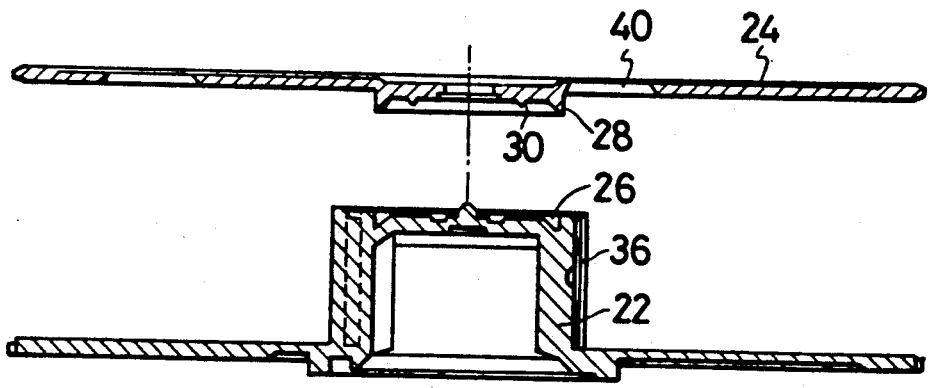
FIG. 4 is an enlarged exploded vertical sectional view of the tape reel shown in FIG. 3.

As shown in FIGS. 2-4, each tape reel 12 includes a reel hub 22 having a joining surface and a reel flange 24 having a joining surface opposite the joining surface of the reel hub 22. The reel hub 22 is adapted to permit a tape 25 to be wound thereon. The reel hub 22 and reel flange 24 are adapted to be joined together along the opposed joining surfaces, as described below.

In addition, the tape reel 12 may be provided with positioning means. For this purpose, the joining surface of the reel hub 22 is provided with a ring-like or annular groove 26 and the joining surface of the reel flange 24 is provided with a ring-like or annular projection 28 sized and shaped for mating engagement in the annular groove 26, all of which is clearly shown in FIG. 4, so that the reel hub 22 and reel flange 24 may be aligned with one another through the engagement of projection 28 in groove 26, as shown in FIG. 3. In the illustrated embodiment, the annular groove 26 is formed on the joining surface of the reel hub 22 and the annular projection 28 is formed on the joining surface of the reel flange 24. However, the location of these features may be reversed; i.e., the annular groove 26 may be formed on the joining surface of the reel flange 24 and the annular projection 28 may be formed on the joining surface of the reel hub 22.

Figure 5:
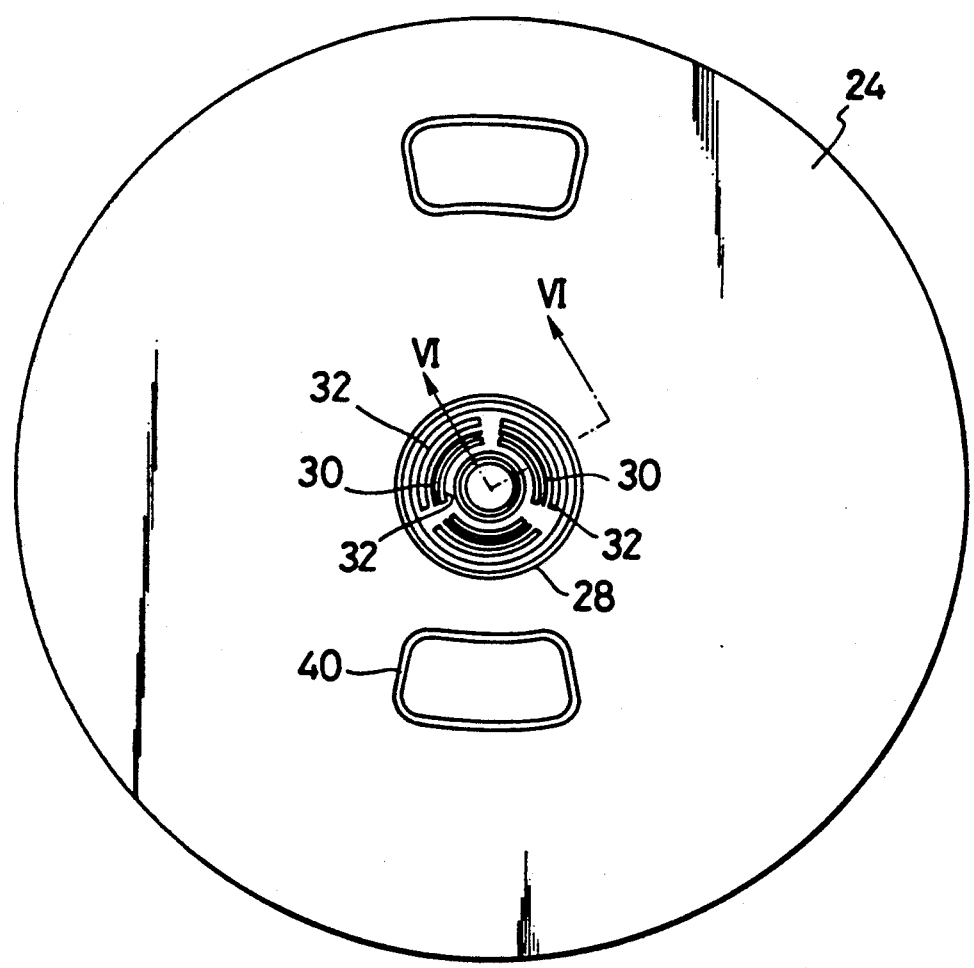
FIG. 5 is a bottom view showing the reel flange of the tape reel shown in FIG. 3.

As shown in FIGS. 4 and 5, the tape reel 12 also includes a deposition rib 30 arranged on the joining surface of the reel flange 24. However, in accordance with the present invention, the deposition rib 30 may alternatively be formed on the joining surface of reel hub 22. In either case, deposition rib 30 may be annularly arranged in an intermittent or discontinuous manner inwardly of the positioning means or annular projection 28 with a suitable interval being defined between the annular projection 28 and the deposition rib 30.

Figure 6:
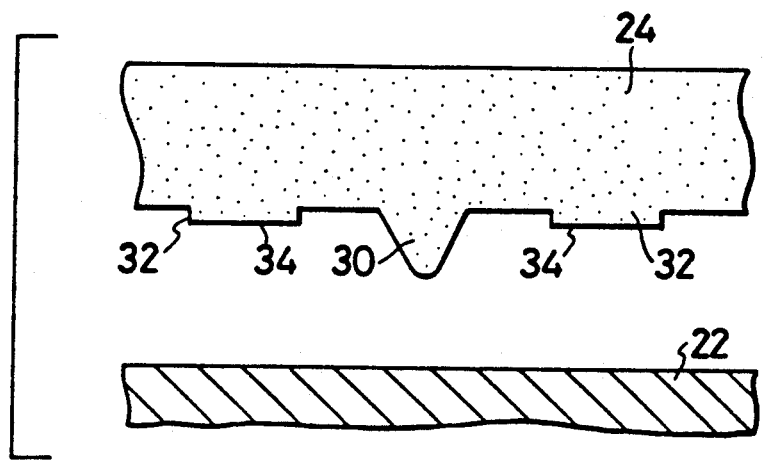
FIG. 6 is a fragmentary schematic sectional view taken along line VI—VI of FIG. 5.

The tape reel 12, as shown in FIGS. 5 and 6, further includes stabilizing ribs 32 provided inwardly of the positioning means or annular projection 28 on reel flange 24. The stabilizing ribs 32 are disposed on either side of deposition rib 30 with a suitable interval being defined between deposition rib 30 and each stabilizing rib 32. The stabilizing ribs 32 each have an abutment surface 34 formed substantially parallel to the joining surfaces of the reel hub 22 and the reel flange 24 and have a vertical dimension or height which is less than that of the deposition rib 30. The stabilizing ribs 32 each may be arranged on the joining surface of the reel flange 24 in an intermittent or discontinuous annular shape, as shown in FIG. 5.

Figure 7:
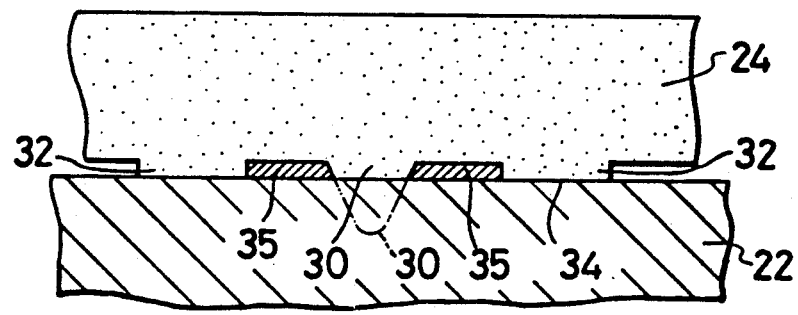
FIG. 7 is a fragmentary schematic sectional view showing the joint between the reel flange and the reel hub shown in FIG. 6.

During construction of the tape reel 12, the central portion of the tape reel 12 is forcibly pressed by the horn of a welding machine, such as an ultrasonic welding machine, to mutually join the reel hub 22 and the reel flange 24, thereby melting the deposition rib 30 to form a melt 35. Melt 35 then spreads or extends in all directions to the stabilizing ribs 32, thereby filling only the space between the deposition rib 30 and each of the stabilizing ribs 32 with a uniform thickness of the melt 35, as shown in FIG. 7, to thereby effectively prevent deflection and/or warpage to occur at the outer periphery of the tape reel.

As shown in FIGS. 2-4, the reel hub 22 is provided at the outer periphery portion thereof with a recess 36 in which a clamp 38 is engagedly fitted and the reel flange 24 is formed with an aperture 40 through which the clamp 38 is inserted.

Figure 8:
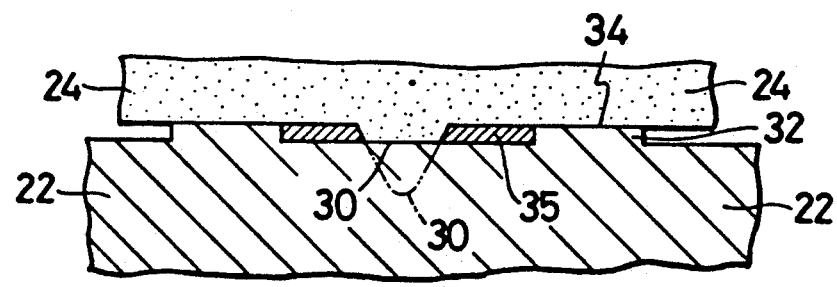
FIG. 8 is a fragmentary schematic sectional view showing a modification of the tape reel shown in FIG. 6.

Although, in accordance with the above description, the stabilizing ribs 32 are provided on the reel flange 24, they may alternatively be provided on the reel hub 22, as shown in FIG. 8. In yet another embodiment, shown in FIG. 9, the inner and outer stabilizing ribs 32 may be separately provided on the reel flange 24 and reel hub 22, respectively. Additionally, although the stabilizing ribs 32 are described above as being formed with an intermittent or discontinuous annular shape, they may alternatively be formed with a continuous annular shape.

As can be seen from the foregoing, the tape reel of the present invention is so constructed that the stabilizing ribs, each having a lesser height than that of the deposition rib and an abutment surface extending parallel to the joining surfaces of the reel hub and reel flange, are arranged on both sides of the deposition rib. Such construction permits the deposition rib, when melted, to be uniformly spread between the joining surfaces of the reel hub and reel flange to properly join the reel hub and reel flange together, thereby effectively preventing any deformation of the tape reel, such as the deflection and/or warpage of the outer periphery thereof. This results not only in simplifying the process for manufacturing the tape reel and increasing the production rate, but enables the tape reel to be mass produced at a low cost. Furthermore, this construction renders the quality of the tape reel substantially uniform, thereby facilitating quality control and increasing manufacturing yields.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as set forth in the appended claims.

What is claimed is:

1. A tape reel for a tape cassette comprising,
a reel hub having a joining surface,
a reel flange having a joining surface adapted for mating engagement with said joining surface of said reel hub,
a deposition rib arranged on one of said joining surfaces and having a predetermined height, and
at least two stabilizing ribs arranged on at least one of said joining surfaces, one of said stabilizing ribs being disposed at a radially spaced distance outwardly of said deposition rib, and another of said stabilizing ribs being disposed at a radially spaced distance inwardly of said deposition rib, said stabilizing ribs each having a height less than said predetermined height of said deposition rib and an abutment surface extending substantially parallel to said joining surfaces of said reel hub and said reel flange.

2. The tape reel as claimed in claim 1, wherein said at least two stabilizing ribs have a discontinuous annular shape.

3. The tape reel as claimed in claim 1, wherein said at least two stabilizing ribs have a continuous annular shape.

4. The tape reel as claimed in claim 1, wherein said deposition rib is arranged on said joining surface of said reel flange.

5. The tape reel as claimed in claim 1, wherein said deposition rib is arranged on said joining surface of said reel hub.

6. The tape reel as claimed in claim 1, wherein said deposition rib has a discontinuous annular shape.

7. The tape reel as claimed in claim 1, wherein said deposition rib has a continuous annular shape.

8. The tape reel as claimed in claim 1, wherein said at least two stabilizing ribs are disposed on said joining surface of said reel flange.

9. The tape reel as claimed in claim 8, wherein said at least two stabilizing ribs have a discontinuous annular shape.

10. The tape reel as claimed in claim 8, wherein said at least two stabilizing ribs have a continuous annular shape.

11. The tape reel as claimed in claim 1, wherein said at least two stabilizing ribs are disposed on said joining surface of said reel hub.

12. The tape reel as claimed in claim 11, wherein said at least two stabilizing ribs have a discontinuous annular shape.

13. The tape reel as claimed in claim 11, wherein said at least two stabilizing ribs have a continuous annular shape.

14. The tape reel as claimed in claim 1, wherein one of said at least two stabilizing ribs is disposed on said joining surface of said reel hub, and another of said at least two stabilizing ribs is disposed on said joining surface of said reel flange.

15. The tape reel as claimed in claim 14, wherein said at least two stabilizing ribs have a discontinuous annular shape.

16. The tape reel as claimed in claim 14, wherein said at least two stabilizing ribs have a continuous annular shape.

17. The tape reel as claimed in claim 1 further comprising, positioning means disposed radially outward of said at least two stabilizing ribs for aligning said reel hub with said reel flange.

18. The tape reel as claimed in claim 17, wherein said positioning means comprises, an annular groove formed on one of said joining surfaces and an annular projection formed on another of said joining surfaces for mating engagement with said annular groove.

* * * * *